(12) United States Patent
Park et al.

(10) Patent No.: US 12,027,692 B2
(45) Date of Patent: Jul. 2, 2024

(54) METHODS OF FORMING ELECTROCHEMICAL CELLS WITH A COMBINATION FORMATION CHARGE RATE

(71) Applicant: Enevate Corporation, Irvine, CA (US)

(72) Inventors: Benjamin Yong Park, Mission Viejo, CA (US); Jill R. Pestana, Long Beach, CA (US); Heidi Leighette Anderson, Newport Beach, CA (US); Sung Won Choi, San Diego, CA (US)

(73) Assignee: ENEVATE CORPORATION, Irvine, CA (US)

( * ) Notice: Subject to any disclaimer, the term of this patent is extended or adjusted under 35 U.S.C. 154(b) by 121 days.

(21) Appl. No.: 16/708,013

(22) Filed: Dec. 9, 2019

(65) Prior Publication Data

US 2021/0175492 A1    Jun. 10, 2021

(51) Int. Cl.
| | |
|---|---|
| *H01M 4/1395* | (2010.01) |
| *H01M 4/04* | (2006.01) |
| *H01M 4/134* | (2010.01) |
| *H01M 4/36* | (2006.01) |
| *H01M 10/0525* | (2010.01) |

(52) U.S. Cl.
CPC ....... *H01M 4/1395* (2013.01); *H01M 4/0447* (2013.01); *H01M 4/134* (2013.01); *H01M 4/366* (2013.01); *H01M 10/0525* (2013.01)

(58) Field of Classification Search
CPC .................................................. H01M 4/1395
See application file for complete search history.

(56) References Cited

U.S. PATENT DOCUMENTS

| | | |
|---|---|---|
| 2004/0119194 A1 | 6/2004 | Aladjov et al. |
| 2012/0107680 A1 | 5/2012 | Amiruddin et al. |
| 2013/0149602 A1 | 6/2013 | Luski et al. |
| 2018/0006293 A1 | 1/2018 | Demaray et al. |
| 2019/0181491 A1 | 6/2019 | Park et al. |
| 2019/0355966 A1 | 11/2019 | Kamath et al. |

FOREIGN PATENT DOCUMENTS

| | | | | |
|---|---|---|---|---|
| CN | 108346836 | * | 7/2018 | .......... H01M 10/446 |
| CN | 108346836 A | * | 7/2018 | .......... H01M 10/446 |

OTHER PUBLICATIONS

English machine translation of CN108346836 originally published to Yu Jul. 31, 2018 (Year: 2018).*
Rago et al, Effect of formation protocol: Cells containing Si-Graphite composite electrodes, Jun. 4, 2019, Journal of Power Sources, pp. 1-7 (Year: 2019).*

(Continued)

*Primary Examiner* — Ula C Ruddock
*Assistant Examiner* — Mary Grace Byram
(74) *Attorney, Agent, or Firm* — McAndrews, Held & Malloy, Ltd.

(57) ABSTRACT

Methods of forming electrochemical cells are described. In some implementations, the method can include providing an electrochemical cell having an electrode with at least about 20% to about 99% by weight of silicon. The method can include providing a formation charge current at a first rate and at a second rate to the electrochemical cell. The first rate can be in a range from about C/100 to about C/10 and the second rate can be greater than about C/10.

83 Claims, 4 Drawing Sheets

(56) References Cited

OTHER PUBLICATIONS

Wood III et al, Prospects for reducing the processing cost of lithium ion batteries, Nov. 6, 2014, Journal of Power Sources, pp. 234-242 (Year: 2014).*
Notification of Transmittal of the International Search Report and the Written Opinion of the International Searching Authority, or the declaration for International Application No. PCT/US2020/063031, International Filing Date Dec. 3, 2020, for Applicant Enevate Corporation, Mailed Mar. 25, 2021.

* cited by examiner

METHODS OF FORMING ELECTROCHEMICAL CELLS WITH A COMBINATION FORMATION CHARGE RATE

BACKGROUND

Field

The present disclosure relates to electrodes, electrochemical cells, and methods of forming electrodes and electrochemical cells. In particular, the present disclosure relates to methods of formation of electrochemical cells, including lithium-ion batteries.

Description of the Related Art

A lithium-ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. For the cathode, separator and anode to be rolled, each sheet must be sufficiently deformable or flexible to be rolled without failures, such as cracks, brakes, mechanical failures, etc. Typical electrodes include electro-chemically active material layers on electrically conductive metals (e.g., aluminum and copper). For example, carbon can be deposited onto a current collector along with an inactive binder material. Carbon is often used because it has excellent electrochemical properties and is also electrically conductive. Electrodes can be rolled or cut into pieces which are then layered into stacks. The stacks are of alternating electro-chemically active materials with the separator between them.

SUMMARY

In certain implementations, a method of forming an electrochemical cell is provided. The method can include providing an electrochemical cell having a rated capacity at 1 C, and providing a formation charge current at a first rate of constant current and a second rate of constant current to the electrochemical cell. The first rate can be in a range from about C/100 to about C/10 and the second rate can be greater than about C/10. The electrochemical cell can include a first electrode and a second electrode. At least the first electrode can include at least about 20% to about 99% by weight of silicon. The electrochemical cell can also include a separator between the first electrode and the second electrode. The electrochemical cell can include an electrolyte in contact with the first electrode, the second electrode, and the separator.

In some instances, the first rate can be in a range from about C/80 to about C/10. For example, the first rate can be in a range from about C/60 to about C/10. As another example, the first rate can be in a range from about C/50 to about C/10.

In some instances, the second rate can be less than or equal to about 10 C. For example, the second rate can be greater than about 0.5 C and less than or equal to about 10 C. As another example, the second rate can be greater than about 1 C and less than or equal to about 10 C. As another example, the second rate can be greater than about 1.5 C and less than or equal to about 10 C.

In some implementations, the formation charge current can be provided at the first rate for about 1 minute to about 1,000 minutes. In some implementations, the formation charge current can be provided at the second rate for about 1 minute to about 1,000 minutes.

In various methods, providing the formation charge current can include charging to partial formation at the first rate. For example, charging to partial formation at the first rate can include charging to about 10% to about 50% of the total capacity of the electrochemical cell. As another example, charging to partial formation at the first rate can include charging to about 10% to about 30% of the total capacity of the electrochemical cell.

In various methods, providing the formation charge current can include charging to partial formation at the second rate. For example, charging to partial formation at the second rate can include charging to about 50% to about 90% of total capacity of the electrochemical cell. As another example, charging to partial formation at the second rate can include charging to about 70% to about 90% of total capacity of the electrochemical cell.

In some implementations, the formation charge current can be provided at the first rate prior to the second rate. In some other implementations, the formation charge current can be provided at the second rate prior to the first rate.

In some instances, the entire formation of the cell can be completed within a single charge or a single charge/discharge cycle.

In some methods, providing the formation charge current can include providing the formation charge current until the cell voltage reaches 4.0 volts to about 4.5 volts. In some examples, providing the formation charge current comprises providing the formation charge current at the first rate until 5 to 50% nominal capacity, and providing the formation charge current at the second rate until the cell voltage reaches 4.0 volts to about 4.5 volts.

In various implementations, the electrochemical cell can be a lithium-ion battery and providing the formation charge current can comprise providing the formation charge current with substantially no lithium plating. In some instances, the first electrode can be an anode. The first electrode can include a silicon-dominant electrode. For example, the first electrode can comprise the silicon at about 30% to about 99% by weight, at about 40% to about 99% by weight, at about 50% to about 99% by weight, at about 60% to about 99% by weight, at about 70% to about 99% by weight, or at about 80% to about 99% by weight.

DETAILED DESCRIPTION

Formation is a step in the production process of electrochemical cells, such as lithium-ion batteries. This step typically occurs in a factory before delivery of cells to a customer. The step usually involves applying current to the cell in such a way that causes lithium to be inserted into the negative electrode. This first "charge" can cause the system to undergo reversible and irreversible reactions. For stability, it may be desirable to control the reactions to control the interfacial layer known as the solid-electrolyte interface (SEI) formed between electrodes and electrolyte and to expel any gasses formed (e.g., such as in a process called degassing). In some cases, the temperature can be increased to increase reaction rate. During formation, typically, the potential of the negative electrode decreases. As the potential of the negative electrode decreases, it can fall below the stability window of the electrolyte solution. The electrolyte solution can begin to react with the negative electrode, forming the SEI. In general, the SEI can reduce and/or minimize further reactions between the negative electrode and the electrolyte solution without preventing the transport of lithium ions to and from the negative electrode. In order to control the nature of the SEI (and thus control the performance characteristics of the cell), it may be desirable to control the formation process. Typically, formation is done with low current in an environment with precise temperature control, and this combination of long process time (due to low current) and costly equipment (due to precise control) can make formation a significant portion of the cost of manufacturing lithium-ion batteries. High currents are generally avoided as they can cause lithium plating and/or other detrimental effects. This is the case especially with graphite which may be the most commonly used anode active material today. Accordingly, formation can be one of the most expensive parts of manufacturing (e.g., due to the time spent in the formation process and the equipment for formation). Many companies are looking to reduce time in formation so that capital investment costs can be reduced.

This application describes certain methods of forming an electrochemical cell which can be performed with decreased formation processing time and with less sophisticated equipment, e.g., compared with current processes. Some examples can include providing an electrochemical cell that has an electrode (e.g., an anode) comprising silicon (e.g., at least about 20% by weight of silicon). Some such electrodes can be advantageous in that relatively high current during formation can be applied without damage to the cell. For example, these electrodes can have relatively high potentials such that lithium plating and other detrimental effects are less likely. Accordingly, some methods can include providing a formation charge current at a combination of a relatively low charge current (e.g., a relatively slow charge rate such as about C/100 to about C/10) and a relatively high charge current (e.g., a relatively fast charge rate such as greater than about C/10). Using a relatively fast charge rate can decrease the formation time and using a relatively slow charge rate can allow for a more robust SEI layer formation than that formed by only a faster formation rate.

Formation Current

One method of decreasing formation time is to increase the charge and discharge rate of the cells, and reduce the number of times the cell is cycled during formation. Unfortunately, cells with a graphite anode that undergo fast charge and discharge rates have poor cycling performance. Graphite is a two-dimensional intercalation material, limiting the amount and rate of lithium that can intercalate into the layered structure.

Silicon can replace graphite as a dominant anode material because of its ability to undergo fast charge and discharge, as well as other benefits. Most electrodes that are considered "silicon anodes" in the industry are graphite anodes with silicon added in relatively small quantities (typically <20%). These graphite-silicon mixture anodes utilize the graphite, which has a lower lithiation voltage compared to silicon; and the silicon has to be nearly fully lithiated in order to utilize the graphite. Therefore, these electrodes do not have the advantage of a silicon or silicon composite anode where the voltage of the electrode can be substantially above 0V vs Li/Li$^+$ and thus less susceptible to lithium plating. Furthermore, these electrodes can have significantly higher excess capacity on the silicon versus the opposite electrode to further increase the robustness to high rates.

In various cell designs described herein, the cell design can be such that the anode is not fully utilized. The anodes can have excess capacity and can be higher in voltage, providing an advantage over other silicon anodes. Silicon, however, can expand substantially more than graphite when lithiated, which can cause instabilities in the SEI, silicon particles, and overall cell upon dilithiation and repeat cycling. It is desired that the instabilities due to the expansion and contraction of silicon particles be minimized to improve cycle performance of cells with a silicon-dominant anode. Since formation initiates the first expansion and SEI layer growth of silicon, tuning formation charge rate to increase (e.g., optimize in some instances) different phenomena, such as SEI composition, thickness, and homogeneity on the anode, can improve cycle performance of a cell with silicon-dominant anodes.

Figure 1:
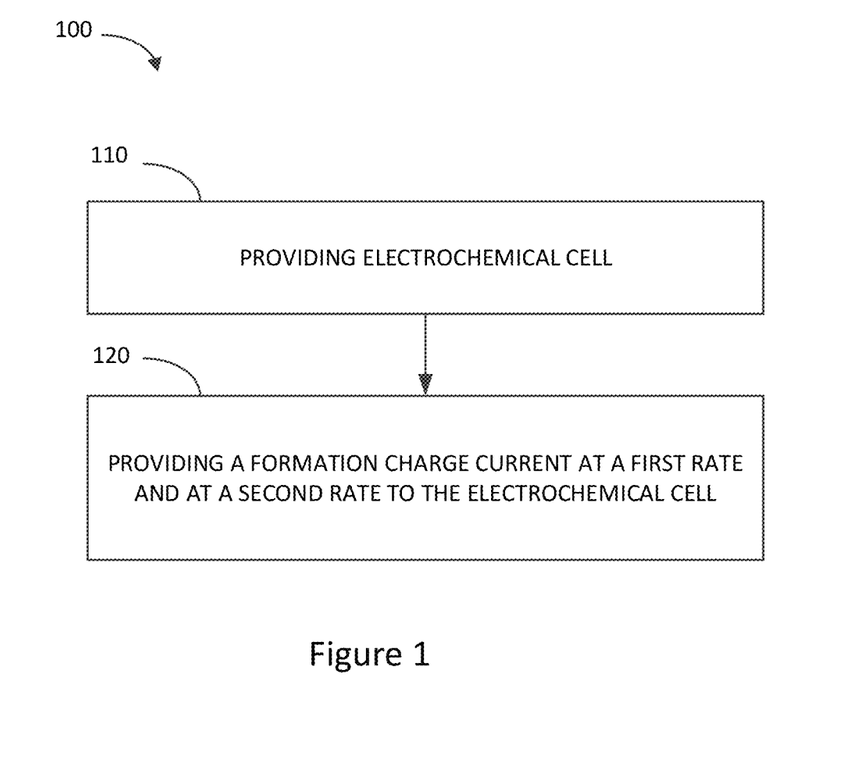
FIG. 1 is a flow diagram schematically illustrating an example method of forming an electrochemical cell in accordance with certain implementations described herein.

FIG. 1 is a flow diagram schematically illustrating an example method of forming an electrochemical cell in accordance with certain implementations described herein. The method 100 of forming an electrochemical cell can include providing an electrochemical cell as shown in block 110. The electrochemical cell can include a first and second electrode, a separator between the first and second electrodes, and electrolyte in contact with the first electrode, the second electrode, and the separator. At least one of the electrodes can comprise at least about 20% by weight of silicon (e.g., at least about 20% to about 99% by weight of silicon).

Various such electrodes as described herein can handle relatively high charge current and/or charge rate without damage to the cell. Accordingly, as shown in block 120, the method 100 of certain implementations can include providing a first formation charge current (e.g., a formation charge current at a first rate of constant current) and at a second formation charge current (e.g., a formation charge current at a second rate of constant current) to the electrochemical cell. In some instances, the formation charge current can be at a first rate in a range from about C/100 to about C/10. In some instances, the formation charge current can be at a second rate greater than about C/10 to the cell.

Without being bound by theory, one reason various implementations of electrodes (e.g., anodes) described herein can take relatively high currents is because the electrodes have a relatively high potential, for example, compared to graphite vs Li/Li+. Because various silicon electrodes described herein are relatively high in voltage, the electrodes may not be fully utilized, and can have excess capacity.

Figure 2:
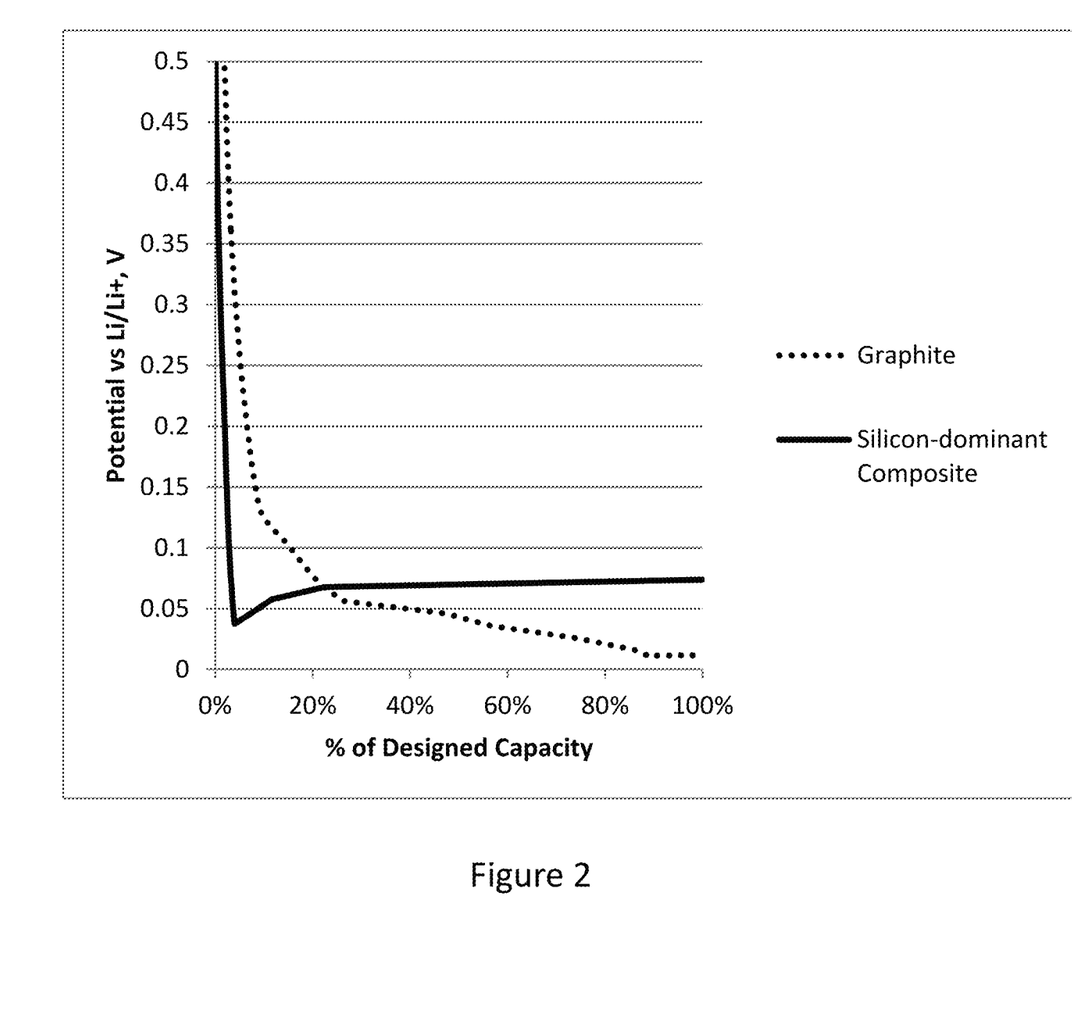
FIG. 2 shows a comparison between the formation voltage profiles of two half-cells made with a standard graphite electrode and an example silicon-dominant composite electrode.

FIG. 2 shows a comparison between the formation voltage profiles of two half-cells made with a standard graphite electrode and an example silicon-dominant composite electrode. In both cases, the electrodes were lithiated to their designed capacities. As shown in FIG. 2, the potential of the graphite electrode fell to ~10 mV vs Li/Li+, whereas the potential of the silicon-dominant composite electrode stabilized at ~70 mV vs Li/Li+ after the initial activation. The graphite electrode was a 3.1 mA/cm$^2$, 96% graphite, 4% PVdF coated anode. It was formed at 0.68 mA/cm$^2$ to 10 mV and tapered to 0.11 mA/cm$^2$. The silicon-dominant composite electrode was a 2.97 mA/cm$^2$, 80% silicon composite anode. It was formed at 0.30 mA/cm$^2$ to nominal capacity. The relatively low potential of the graphite electrode can be problematic because non-uniformities in current density, diffusion, or charge transfer rate can create localized areas of low potential where lithium plating can occur. In contrast, the relatively high potential of the silicon-dominate composite electrode makes lithium plating dramatically less likely. Via Ohm's law, the relative rate advantage of the silicon-dominant composite electrode over the graphite electrode at a given impedance can be expressed as the ratio of the characteristic potentials vs. Li/Li+. Accordingly, the example silicon-dominant composite electrode can have a 7× improvement (e.g., 70 mV/10 mV) in rate capability over the graphite anode.

With reference to block 110 in FIG. 1, the provided electrochemical cell can include at least one electrode comprising a silicon-dominant electrode. The electrode can include at least about 20% by weight of silicon. In certain implementations, the electrode can include at least about 20% to about 99% by weight of silicon. For example, the weight percentage of silicon can be any value within this range (e.g., about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, etc.), or any range within this range such as any range formed by the example values (e.g., about 30% to about 99%, about 40% to about 99%, about 50% to about 99%, about 60% to about 99%, about 70% to about 99%, about 80% to about 99%, about 90% to about 99%, about 30% to about 95%, about 40% to about 95%, about 50% to about 95%, about 60% to about 95%, about 70% to about 95%, about 80% to about 95%, about 30% to about 90%, about 40% to about 90%, about 50% to about 90%, about 60% to about 90%, about 70% to about 90%, about 80% to about 90%, etc.). The electrode can also include additives such as conductive material (e.g., one or more metals or alloys) and/or graphite active material. U.S. patent application Ser. No. 13/008,800, filed Jan. 18, 2011, and published on Jul. 21, 2011 as U.S. Patent Application Publication No. 2011/0177393, entitled "Composite Materials for Electrochemical Storage;" U.S. patent application Ser. No. 13/601,976, filed Aug. 31, 2012, and published on Jun. 19, 2014 as U.S. Patent Application Publication No. 2014/0170498, entitled "Silicon Particles for Battery Electrodes," and U.S. patent application Ser. No. 13/799,405, filed Mar. 13, 2013, and published on Jun. 19, 2014 as U.S. Patent Application Publication No. 2014/0166939, entitled "Silicon Particles for Battery Electrodes," each of which are incorporated by reference herein, describe certain implementations of carbon-silicon composite materials using carbonized polymer and silicon material which can be used as the silicon-dominant electrode. Further example implementations of the electrode are described herein.

The silicon-dominant electrode can be used as an anode, a cathode, or both an anode and cathode. For example, the composite material can be used as an anode in electrochemical cells, e.g., most conventional lithium-ion batteries; they may also be used as the cathode in some electrochemical couples, e.g., with additional additives. In some instances, the voltage of the electrodes can be designed to be higher than about 10 mV to about 70 mV vs Li/Li+. Various implementations of the provided electrochemical cells can be either secondary batteries (e.g., rechargeable) or primary batteries (e.g., non-rechargeable). The electrochemical cell can have a rated capacity of 1 C.

With reference to block 120 in FIG. 1, the formation charge current can be provided at a first rate (e.g., of constant current) and at a second rate (e.g., of constant current) to the electrochemical cell. In various implementations, the second rate can be faster than the first rate. For example, the first rate can be a relatively slow rate, and the second rate can be a relatively fast rate. In some implementations, the formation charge current can be provided at a first rate in a range from about C/100 to about C/10. For example, the formation charge current can be provided at a first rate of any charge rate within this range (e.g., about C/100, about C/95, about C/90, about C/85, about C/80, about C/75, about C/70, about C/65, about C/60, about C/55, about C/50, about C/45, about C/40, about C/35, about C/30, about C/25, about C/20, about C/15, about C/10, etc.), or any range within this range such as any range formed by the example values (e.g., about C/100 to about C/20, about C/100 to about C/30, about C/100 to about C/40, about C/100 to about C/50, about C/90 to about C/10, about C/80 to about C/10, about C/70 to about C/10, about C/60 to about C/10, about C/50 to about C/10, etc.). In some implementations, the formation charge current can be provided at a second rate greater than about C/10 (e.g., greater than about C/5, greater than about C/2, greater than about 1 C, etc.). For instance, the formation charge current can be provided at a second rate between about C/10 to about 10 C. For example, the formation charge current can be provided at a second rate of any charge rate within this range (e.g., about C/10, about C/5, about 0.5 C, about 0.7 C, about 1 C, about 1.2 C, about 1.5 C, about 1.7 C, about 2 C, about 2.5 C, about 3 C, about 3.5 C, about 4 C, about 4.5 C, about 5 C, about 7 C, about 10 C, etc.), or any range within this range such as any range formed by the example values (e.g., about C/10 to about 5 C, about C/5 to about 5 C, about 0.5 C to about 5 C, about 0.7 C to about 5 C, about 1 C to about 5 C, about 1.5 C to about 5 C, about 1.7 C to about 5 C, about C/5 to about 10 C, about 0.5 C to about 10 C, about 0.7 C to about 10 C, about 1 C to about 10 C, about 1.5 C to about 10 C, about 1.7 C to about 10 C, etc.). Other examples are possible.

In various implementations, the formation charge current can be provide at the first rate prior to the second rate. In other implementations, the formation charge current can be provided at the second rate prior to the first rate.

In various implementations, the formation charge current can be provided to the electrochemical cell with substantially no lithium plating and/or other undesired side reactions during formation. Because the silicon-dominant electrodes can accept relatively high charge rates, formation can be performed in less time compared to conventional manufacturing. In some implementations, the formation charge current can be provided at the first rate for about 1 minute to about 1000 minutes. For example, the amount of time the formation charge current is provided at the first rate can be any amount of time within this range (e.g., about 1 minute, about 2 minutes, about 3 minutes, about 5 minutes, about 10 minutes, about 20 minutes, about 30 minutes, about 40 minutes, about 50 minutes, about 60 minutes, about 70 minutes, about 75 minutes, about 80 minutes, about 90 minutes, about 100 minutes, about 150 minutes, about 200 minutes, about 250 minutes, about 300 minutes, about 350 minutes, about 400 minutes, about 450 minutes, about 500 minutes, about 550 minutes, about 600 minutes, about 650 minutes, about 700 minutes, about 750 minutes, about 800 minutes, about 850 minutes, about 900 minutes, about 950 minutes, about 1000 minutes, etc.), or any range within this range such as any range formed by the example values (e.g., about 10 minutes to about 1000 minutes, about 50 minutes to about 1000 minutes, about 100 minutes to about 1000 minutes, about 200 minutes to about 1000 minutes, about 300 minutes to about 1000 minutes, about 400 minutes to about 1000 minutes, about 500 minutes to about 1000 minutes, about 10 minutes to about 900 minutes, about 50 minutes to about 900 minutes, about 100 minutes to about 900 minutes, about 200 minutes to about 900 minutes, about 250 minutes to about 900 minutes, about 10 minutes to about 800 minutes, about 50 minutes to about 800 minutes, about 100 minutes to about 800 minutes, about 200 minutes to about 800 minutes, about 250 minutes to about 800 minutes, about 10 minutes to about 750 minutes, about 50 minutes to about 750 minutes, about 100 minutes to about 750 minutes, about 200 minutes to about 750 minutes, about 250 minutes to about 750 minutes, about 1 minute to about 500 minutes, about 1 minute to about 400 minutes, about 1 minute to about 300 minutes, about 1 minute to about 250 minutes, about 5 minutes to about 500 minutes, about 5 minutes to about 400 minutes, about 5 minutes to about 300 minutes, about 5 minutes to about 250 minutes, about 10 minutes to about 500 minutes, about 10 minutes to about 400 minutes, about 10 minutes to about 300 minutes, about 10 minutes to about 250 minutes, etc.).

In some implementations, the formation charge current can be provided at the second rate for about 1 minute to about 1000 minutes. For example, the amount of time the formation charge current is provided at the second rate can be any amount of time within this range (e.g., about 1 minute, about 2 minutes, about 3 minutes, about 5 minutes, about 10 minutes, about 20 minutes, about 30 minutes, about 40 minutes, about 50 minutes, about 60 minutes, about 70 minutes, about 75 minutes, about 80 minutes, about 90 minutes, about 100 minutes, about 150 minutes, about 200 minutes, about 250 minutes, about 300 minutes, about 350 minutes, about 400 minutes, about 450 minutes, about 500 minutes, about 550 minutes, about 600 minutes, about 650 minutes, about 700 minutes, about 750 minutes, about 800 minutes, about 850 minutes, about 900 minutes, about 950 minutes, about 1000 minutes, etc.), or any range within this range such as any range formed by the example values (e.g., about 10 minutes to about 1000 minutes, about 50 minutes to about 1000 minutes, about 100 minutes to about 1000 minutes, about 200 minutes to about 1000 minutes, about 300 minutes to about 1000 minutes, about 400 minutes to about 1000 minutes, about 500 minutes to about 1000 minutes, about 10 minutes to about 900 minutes, about 50 minutes to about 900 minutes, about 100 minutes to about 900 minutes, about 200 minutes to about 900 minutes, about 250 minutes to about 900 minutes, about 10 minutes to about 800 minutes, about 50 minutes to about 800 minutes, about 100 minutes to about 800 minutes, about 200 minutes to about 800 minutes, about 250 minutes to about 800 minutes, about 10 minutes to about 750 minutes, about 50 minutes to about 750 minutes, about 100 minutes to about 750 minutes, about 200 minutes to about 750 minutes, about 250 minutes to about 750 minutes, about 1 minute to about 500 minutes, about 1 minute to about 400 minutes, about 1 minute to about 300 minutes, about 1 minute to about 250 minutes, about 5 minutes to about 500 minutes, about 5 minutes to about 400 minutes, about 5 minutes to about 300 minutes, about 5 minutes to about 250 minutes, about 10 minutes to about 500 minutes, about 10 minutes to about 400 minutes, about 10 minutes to about 300 minutes, about 10 minutes to about 250 minutes, etc.).

In some instances, the formation charge current can be provided at the first rate for a longer period of time than at the second rate. For example, the formation charge current can be provide at the first rate for a period of about 500 minutes to about 700 minutes (e.g., about 500 minutes, about 510 minutes, about 520 minutes, about 530 minutes, about 540 minutes, about 550 minutes, about 560 minutes, about 570 minutes, about 580 minutes, about 590 minutes, about 600 minutes, about 610 minutes, about 620 minutes, 630 minutes, about 640 minutes, about 650 minutes, about 660 minutes, about 670 minutes, about 680 minutes, about 690 minutes, about 700 minutes, etc.) and at the second rate for a period of about 10 minutes to about 200 minutes (e.g., about 10 minutes, about 20 minutes, about 30 minutes, about 40 minutes, about 50 minutes, about 60 minutes, about 70 minutes, about 80 minutes, about 90 minutes, about 100 minutes, about 110 minutes, about 120 minutes, about 130 minutes, about 140 minutes, about 150 minutes, about 160 minutes, about 170 minutes, about 180 minutes, about 190 minutes, about 200 minutes, etc.).

In some other instances, the formation charge current can be provided at the second rate for a longer period of time than at the first rate. For example, the formation charge current can be provide at the first rate for a period of about 10 minutes to about 200 minutes (e.g., about 10 minutes, about 20 minutes, about 30 minutes, about 40 minutes, about 50 minutes, about 60 minutes, about 70 minutes, about 80 minutes, about 90 minutes, about 100 minutes, about 110 minutes, about 120 minutes, about 130 minutes, about 140 minutes, about 150 minutes, about 160 minutes, about 170 minutes, about 180 minutes, about 190 minutes, about 200 minutes, etc.) and at the second rate for a period of about 500 minutes to about 700 minutes (e.g., about 500 minutes, about 510 minutes, about 520 minutes, about 530 minutes, about 540 minutes, about 550 minutes, about 560 minutes, about 570 minutes, about 580 minutes, about 590 minutes, about 600 minutes, about 610 minutes, about 620 minutes, 630 minutes, about 640 minutes, about 650 minutes, about 660 minutes, about 670 minutes, about 680 minutes, about 690 minutes, about 700 minutes, etc.).

In some instances, the formation charge current can be provided at the second rate for a period of time that is about equal to the first rate. For example, the formation charge current can be provide at the first rate and second rate each for a period of about 1 minute to about 100 minutes (e.g., about 1 minute, about 2 minutes, about 3 minutes, about 5 minutes, about 10 minutes, about 20 minutes, about 30 minutes, about 40 minutes, about 50 minutes, about 60 minutes, about 70 minutes, about 80 minutes, about 90 minutes, about 100 minutes, etc.).

The formation time for providing the charge current at the first rate and at the second rate can be for a combined period of about 2 minutes to about 2000 minutes, about 50 minutes to about 1000 minutes, about 75 minutes to about 750 minutes, etc. By providing the formation charge current at a combination of a slow and fast charge rate, various implementations can form robust SEI layer growth (e.g., due to the period provided at a slow charge rate) and reduce the formation time (e.g., due to the period provided at a fast charge rate).

In some instances, to further reduce processing time and/or reduce irreversible capacity, the cell can be charged to partial formation at the first and/or the second rate. For example, the formation charge current can be provided at the first rate from about 5% to about 50% of the total capacity of the cell. For example, the formation charge current can be provided at the first rate to any percentage within this range (e.g., about 5%, about 10%, about 15%, about 20%, about 25%, about 30%, about 35%, about 40%, about 45%, about 50%, etc.), or any range within this range such as any range formed by the example values (e.g., about 5% to about 30%, about 5% to about 40%, about 10% to about 30%, about 10% to about 40%, about 10% to about 50%, about 15% to about 30%, about 15% to about 40%, about 15% to about 50%, about 20% to about 50%, about 30% to about 50%, etc.). In some instances, the formation charge current can be provided at the second rate from about 50% to about 90% of the total capacity of the cell. For example, the formation charge current can be provided to any percentage within this range (e.g., about 50%, about 55%, about 60%, about 65%, about 70%, about 75%, about 80%, about 85%, about 90%, etc.), or any range within this range such as any range formed by the example values (e.g., about 55% to about 90%, about 60% to about 90%, about 70% to about 90%, about 50% to about 80%, about 50% to about 70%, about 50% to about 60%, etc.). Other examples are possible.

In various implementations, the whole formation of the cell can be completed within a single charge or a single charge/discharge cycle. The cell can be formed using a constant current/constant voltage (CC/CV) process. For example, the charge current can be provided at a constant value until a certain voltage is reached. The current can taper and/or be reduced as the battery fully charges. In some instances, the formation charge current can be provided until the cell voltage reaches about 4.0 volts to about 4.5 volts. In some instances, the formation charge current at the first rate can be provided until 5% to about 50% nominal capacity, and the formation charge current at the second rate can be provided until the cell voltage reaches about 4.0 volts to about 4.5 volts.

Electrodes and Methods of Forming the Same

In various implementations, the electrodes (e.g., anodes and cathodes) may include carbonized polymer and silicon material. For example, a mixture that includes a carbon precursor including silicon material can be formed into a composite material. This mixture can include both carbon and silicon and thus can be referred to as a carbon-silicon composite material, a silicon-carbon composite material, a carbon composite material, or a silicon composite material.

Typical carbon anode electrodes include a current collector such as a copper sheet. Carbon is deposited onto the collector along with an inactive binder material. Carbon is often used because it has excellent electrochemical properties and is also electrically conductive. Anode electrodes used in the rechargeable lithium-ion cells typically have a specific capacity of approximately 200 milliamp hours per gram (including the metal foil current collector, conductive additives, and binder material). Graphite, the active material used in most lithium-ion battery anodes, has a theoretical energy density of 372 milliamp hours per gram (mAh/g). In comparison, silicon has a high theoretical capacity of 4200 mAh/g. Silicon, however, swells in excess of 300% upon lithiation. Because of this expansion, anodes including silicon may expand/contract and lose electrical contact to the rest of the anode. Therefore, a silicon anode should be designed to be able to expand while maintaining good electrical contact with the rest of the electrode.

U.S. patent application Ser. No. 13/008,800, U.S. patent application Ser. No. 13/601,976, and U.S. patent application Ser. No. 13/799,405, each of which are incorporated by reference herein, describe certain implementations of carbon-silicon composite materials using carbonized polymer and silicon material. The carbonized polymer can act as an expansion buffer for silicon particles during cycling so that a high cycle life can be achieved. In certain implementations, the resulting electrode can be an electrode that is comprised substantially of active material. For example, the carbonized polymer can form a substantially continuous conductive carbon phase(s) in the entire electrode as opposed to particulate carbon suspended in a non-conductive binder in one class of conventional lithium-ion battery electrodes. Because the polymer can be converted into an electrically conductive and electrochemically active matrix, the resulting electrode can be conductive enough that a metal foil or mesh current collector may be omitted, minimized, or reduced in some implementations. Accordingly, in U.S. patent application Ser. No. 13/008,800, application Ser. No. 13/601,976, and U.S. patent application Ser. No. 13/799,405, certain implementations of monolithic, self-supported electrodes are disclosed. The electrodes can have a high energy density of between about 500 mAh/g to about 3500 mAh/g that can be due to, for example, 1) the use of silicon, 2) elimination or substantial reduction of metal current collectors, and 3) being comprised entirely or substantially entirely of active material.

The carbon-silicon composite material can be formed by forming a mixture including a precursor, and pyrolyzing the precursor to convert the precursor to a carbon phase. In certain implementations, the carbon precursor is a hydrocarbon compound. For example, the precursor can include polyamideimide, polyamic acid, polyimide, etc. Other precursors include phenolic resins, epoxy resins, and other polymers. The mixture can further include a solvent. For example, the solvent can be N-methyl-pyrollidone (NMP). Other possible solvents include acetone, diethyl ether, gamma butyrolactone, isopropanol, dimethyl carbonate, ethyl carbonate, dimethoxyethane, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrollidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. In certain implementations, the amount of precursor (e.g., solid polymer) in the solvent is about 10 wt. % to about 30 wt. %.

The mixture can include silicon particles as described herein. The mixture may comprise about 5% to about 80% by weight of the precursor, and at least about 20% to about 99% by weight of the silicon particles. Additional materials can also be included in the mixture. As an example, carbon particles including graphite active material, chopped or milled carbon fiber, carbon nanofibers, carbon nanotubes, and other conductive carbons can be added to the mixture. Conductive particles can also be added to the mixture. In addition, the mixture can be mixed to homogenize the mixture.

In certain implementations, the mixture is cast on a substrate. In some implementations, casting includes using a gap extrusion, tape casting, or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a substrate comprising a polymer sheet, a polymer roll, and/or foils or rolls made of glass or metal. The mixture can then be dried to remove the solvent. For example, a polyamic acid and NMP solution can be dried at about 110° C. for about 2 hours to remove the NMP solution. The dried mixture can then be removed from the substrate. For example, an aluminum substrate can be etched away with HCl. Alternatively, the dried mixture can be removed from the substrate by peeling or otherwise mechanically removing the dried mixture from the substrate. In some implementations, the substrate comprises polyethylene terephthalate (PET), including for example Mylar®. In certain implementations, the dried mixture is a film or sheet. In some implementations, the dried mixture is optionally cured. In some implementations, the dried mixture may be further dried. For example, the dried mixture can placed in a hot press (e.g., between graphite plates in an oven). A hot press can be used to further dry and/or cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, de-ionized (DI) water can be used to rinse the dried mixture. In certain implementations, tape casting techniques can be used for the casting. In some implementations, the mixture can be coated on a substrate by a slot die coating process (e.g., metering a constant or substantially constant weight and/or volume through a set or substantially set gap). In some other implementations, there is no substrate for casting and the anode film does not need to be removed from any substrate. The dried mixture may be cut or mechanically sectioned into smaller pieces.

The mixture further goes through pyrolysis to convert the polymer precursor to carbon. In certain implementations, the mixture is pyrolysed in a reducing atmosphere. For example, an inert atmosphere, a vacuum and/or flowing argon, nitrogen, or helium gas can be used. In some implementations, the mixture is heated to about 900° C. to about 1350° C. For example, polyimide formed from polyamic acid can be carbonized at about 1175° C. for about one hour. In certain implementations, the heat up rate and/or cool down rate of the mixture is about 10° C./min. A holder may be used to keep the mixture in a particular geometry. The holder can be graphite, metal, etc. In certain implementations, the mixture is held flat. After the mixture is pyrolysed, tabs can be attached to the pyrolysed material to form electrical contacts. For example, nickel, copper or alloys thereof can be used for the tabs.

In certain implementations, one or more of the methods described herein can be carried out in a continuous process. In certain implementations, casting, drying, possibly curing and pyrolysis can be performed in a continuous process. For example, the mixture can be coated onto a glass or metal cylinder. The mixture can be dried while rotating on the cylinder to create a film. The film can be transferred as a roll or peeled and fed into another machine for further processing. Extrusion and other film manufacturing techniques known in industry could also be utilized prior to the pyrolysis step.

Pyrolysis of the precursor forms a pyrolytic carbon and results in one or more type of carbon phases. The term "pyrolytic carbon" refers to carbon formed by pyrolysis. Pyrolytic carbon may comprise hard and/or soft carbon, but does not include graphite. In some implementations, the precursor is any material that can be pyrolysed to form a pyrolytic carbon. When the mixture includes one or more additional materials or phases in addition to the carbonized precursor, a composite material can be created. In particular, the mixture can include silicon particles, creating a silicon-carbon (e.g., at least one first phase comprising silicon and at least one second phase comprising carbon) or silicon-carbon-carbon (e.g., at least one first phase comprising silicon, at least one second phase comprising carbon, and at least one third phase comprising carbon) composite material.

Silicon particles can increase the specific lithium insertion capacity of the composite material. When silicon absorbs lithium ions, it experiences a large volume increase on the order of 300+ volume percent which can cause electrode structural integrity issues. In addition to volumetric expansion related problems, silicon is not inherently electrically conductive, but becomes conductive when it is alloyed with lithium (e.g., lithiation). When silicon de-lithiates, the surface of the silicon losses electrical conductivity. Furthermore, when silicon de-lithiates, the volume decreases which results in the possibility of the silicon particle losing contact with the matrix. The dramatic change in volume also results in mechanical failure of the silicon particle structure, in turn, causing it to pulverize. Pulverization and loss of electrical contact have made it a challenge to use silicon as an active material in lithium-ion batteries. A reduction in the initial size of the silicon particles can prevent further pulverization of the silicon powder as well as minimizing the loss of surface electrical conductivity. Furthermore, adding material to the composite that can elastically deform with the change in volume of the silicon particles can reduce the chance that electrical contact to the surface of the silicon is lost. For example, the composite material can include carbons such as graphite which contributes to the ability of the composite to absorb expansion and which is also capable of intercalating lithium ions adding to the storage capacity of the electrode (e.g., chemically active). Therefore, the composite material may include one or more types of carbon phases.

As described herein, in order to increase volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, are viable candidates as active materials for the negative or positive electrode. As described herein, the amount of silicon provided in the mixture or in the composite material can be within a range from about 20% to about 99% by weight of the composite material.

In some implementations, all, substantially all, or at least some of the silicon particles may have a particle size (e.g., the diameter or the largest dimension of the particle) less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 20 µm, between about 0.5 µm and about 20 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, and about 100 nm. For example, in some implementations, the average particle size (or the average diameter or the average largest dimension) or the median particle size (or the median diameter or the median largest dimension) of the silicon particles can be less than about 50 μm, less than about 40 μm, less than about 30 μm, less than about 20 μm, less than about 10 μm, less than about 1 μm, between about 10 nm and about 50 μm, between about 10 nm and about 40 μm, between about 10 nm and about 30 μm, between about 10 nm and about 20 μm, between about 0.1 μm and about 20 μm, between about 0.5 μm and about 20 μm, between about 1 μm and about 20 μm, between about 1 μm and about 15 μm, between about 1 μm and about 10 μm, between about 10 nm and about 10 μm, between about 10 nm and about 1 μm, less than about 500 nm, less than about 100 nm, and about 100 nm. In some implementations, the silicon particles may have a distribution of particle sizes. For example, at least about 95%, at least about 90%, at least about 85%, at least about 80%, at least about 70%, or at least about 60% of the particles may have the particle size described herein.

In certain implementations, the silicon particles are at least partially crystalline, substantially crystalline, and/or fully crystalline. Furthermore, the silicon particles may or may not be substantially pure silicon. For example, the silicon particles may be substantially silicon or may be a silicon alloy. In one implementation, the silicon alloy includes silicon as the primary constituent along with one or more other elements.

Advantageously, the silicon particles described herein can improve performance of electro-chemically active materials such as improving capacity and/or cycling performance. Furthermore, electro-chemically active materials having such silicon particles may not significantly degrade as a result of lithiation of the silicon particles.

The amount of carbon obtained from the precursor can be greater than 0% to about 80% by weight such as about 1% to about 80% by weight, about 1% to about 70% by weight, about 1% to about 60% by weight, about 1% to about 50% by weight, about 1% to about 40% by weight, about 1% to about 30% by weight, about 5% to about 80% by weight, about 5% to about 70% by weight, about 5% to about 60% by weight, about 5% to about 50% by weight, about 5% to about 40% by weight, about 5% to about 30% by weight, about 10% to about 80% by weight, about 10% to about 70% by weight, about 10% to about 60% by weight, about 10% to about 50% by weight, about 10% to about 40% by weight, about 10% to about 30% by weight, about 10% to about 25% by weight, etc. For example, the amount of carbon obtained from the precursor can be about 1%, about 5%, about 10% by weight, about 15% by weight, about 20% by weight, about 25% by weight, etc. from the precursor. The carbon is obtained through heating a carbon-containing precursor at a temperature sufficient for pyrolysis of the precursor to occur, and is thus pyrolytic carbon.

The carbon from the precursor can be hard and/or soft carbon. Hard carbon can be a carbon that does not convert into graphite even with heating in excess of 2800 degrees Celsius. Precursors that melt or flow during pyrolysis convert into soft carbons with sufficient temperature and/or pressure. In some instances, upon further heat treatment, (e.g., between 2000° C.-3000° C.) precursors may form graphite. Hard carbon may be selected in some implementations since soft carbon precursors may flow and soft carbons and graphite are mechanically weaker than hard carbons. Possible pyrolytic carbon precursors can include polyimide (or a polyimide precursor), other aromatic polyimides, phenolic resins, epoxy resins, poly(p-phenylene vinylene) (PPV), poly(p-phenylene-1,3,4-oxadiazole) (POD), benzimidazobenzophenanthroline ladder (BBL) polymer, and other polymers that have a very high melting point or are crosslinked. The amount of pyrolytic carbon (e.g., hard carbon and/or soft carbon, but not graphite) in the composite material can be any of the ranges described herein with respect to the amount of carbon obtained from the precursor. In certain implementations, the pyrolytic carbon phase is substantially amorphous. In other implementations, the pyrolytic carbon phase is substantially crystalline. In further implementations, the pyrolytic carbon phase includes amorphous and crystalline carbon. The pyrolytic carbon phase can be a matrix phase in the composite material. The pyrolytic carbon can also be embedded in the pores of the additives including silicon. The pyrolytic carbon may react with some of the additives to create some materials at interfaces. For example, there may be a silicon carbide layer or a silicon carbide containing oxygen (Si—C—O) layer between silicon particles and the pyrolytic carbon.

In some implementations, upon further heat treatment, graphite is one of the types of carbon phases from the precursor. In certain implementations, graphite particles are added to the mixture. Graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer (in certain directions) than pyrolytic carbon and can better absorb the volume expansion of silicon additives. In certain implementations, all, substantially all, or at least some of the graphite particles may have a particle size (e.g., a diameter or a largest dimension) between about 0.5 microns and about 20 microns. In some implementations, an average particle size (e.g., an average diameter or an average largest dimension) or median particle size (e.g., a median diameter or a median largest dimension) of the graphite particles is between about 0.5 microns and about 20 microns. In some implementations, the graphite particles may have a distribution of particle sizes. For example, at least about 95%, at least about 90%, at least about 85%, at least about 80%, at least about 70%, or at least about 60% of the particles may have the particle size described herein. In certain implementations, the composite material can include graphite particles in an amount greater than 0% and less than about 80% by weight, including from 40% to about 75% by weight, from about 5% to about 30% by weight, from 5% to about 25% by weight, from 5% to about 20% by weight, or from 5% to about 15% by weight.

In certain implementations, conductive particles which may also be electrochemically active are added to the mixture. Such particles can enable both a more electronically conductive composite as well as a more mechanically deformable composite capable of absorbing the large volumetric change incurred during lithiation and de-lithiation. In certain implementations, all, substantially all, or at least some of the conductive particles can have a particle size (e.g., the diameter or the largest dimension) between about 10 nanometers and about 7 micrometers. In some implementations, an average particle size (e.g., an average diameter or an average largest dimension) or a median particle size (e.g., a median diameter or a median largest dimension) of the conductive particles is between about 10 nm and about 7 micrometers. In some implementations, the conductive particles may have a distribution of particle sizes. For example, at least about 95%, at least about 90%, at least about 85%, at least about 80%, at least about 70%, or at least about 60% of the particles may have the particle size described herein.

In certain implementations, the mixture includes conductive particles in an amount greater than zero and up to about 80% by weight. In some implementations, the composite material includes about 45% to about 80% by weight. The conductive particles can be conductive carbon including carbon blacks, carbon fibers, carbon nanofibers, carbon nanotubes, etc. Many carbons that are considered as conductive additives that are not electrochemically active become active once pyrolysed in a polymer matrix. Alternatively, the conductive particles can be metals or alloys including copper, nickel, or stainless steel.

After the precursor is pyrolyzed, the resulting carbon material can be a self-supporting monolithic structure. The carbonized precursor results in an electrochemically active structure that holds the composite material together. For example, the carbonized precursor can be a substantially continuous phase. Advantageously, the carbonized precursor can be a structural material as well as an electro-chemically active and electrically conductive material. In certain implementations, material particles added to the mixture are homogenously or substantially homogeneously distributed throughout the composite material to form a homogeneous or substantially homogeneous composite.

In some implementations, the composite material and/or electrode does not include a polymer beyond trace amounts that remain after pyrolysis of the precursor. In further implementations, the composite material and/or electrode does not include a non-electrically conductive binder. The composite material may also include porosity. In some implementations, the composite material (or the film) can include porosity of about 1% to about 70% or about 5% to about 50% by volume porosity. For example, the porosity can be about 5% to about 40% by volume porosity.

A current collector may be preferred in some applications, for example, where current above a certain threshold or additional mechanical support may be desired. U.S. patent application Ser. No. 13/333,864, filed Dec. 21, 2011, and published on Jun. 19, 2014 as U.S. Patent Application Publication No. 2014/0170482, entitled "Electrodes, Electrochemical Cells, and Methods of Forming Electrodes and Electrochemical Cells," U.S. patent application Ser. No. 13/796,922, filed Mar. 12, 2013, and published on Jun. 19, 2014 as U.S. Patent Application Publication No. 2014/0170475, entitled "Electrodes, Electrochemical Cells, and Methods of Forming Electrodes and Electrochemical Cells," and U.S. patent application Ser. No. 15/471,860, filed Mar. 28, 2017, and published on Oct. 4, 2018 as U.S. Patent Application Publication No. 2018/0287129, entitled "Methods of Forming Carbon-Silicon Composite Material on a Current Collector," each of which is incorporated by reference herein, describe certain implementations of electrodes including a current collector, electrochemical cells comprising such electrodes, and methods of forming such electrodes and electrochemical cells.

In some implementations, the full capacity of the composite material of the electrodes described herein may not be utilized during use of the battery to improve life of the battery (e.g., number charge and discharge cycles before the battery fails or the performance of the battery decreases below a usability level). For example, a composite material with about 70% by weight of silicon particles, about 20% by weight of carbon from a precursor, and about 10% by weight of graphite may have a maximum gravimetric capacity of about 3000 mAh/g, while the composite material may only be used up to an gravimetric capacity of about 550 to about 1500 mAh/g. Although, the maximum gravimetric capacity of the composite material may not be utilized, using the composite material at a lower capacity can still achieve a higher capacity than certain lithium ion batteries. In certain implementations, the composite material is used or only used at an gravimetric capacity below about 70% of the composite material's maximum gravimetric capacity. For example, the composite material is not used at an gravimetric capacity above about 70% of the composite material's maximum gravimetric capacity. In further implementations, the composite material is used or only used at an gravimetric capacity below about 50% of the composite material's maximum gravimetric capacity or below about 30% of the composite material's maximum gravimetric capacity.

EXAMPLES

The following examples are provided to demonstrate the benefits of some embodiments of electrodes, electrochemical cells, and methods of forming the same. These examples are discussed for illustrative purposes and should not be construed to limit the scope of the disclosed embodiments.

Figure 3:
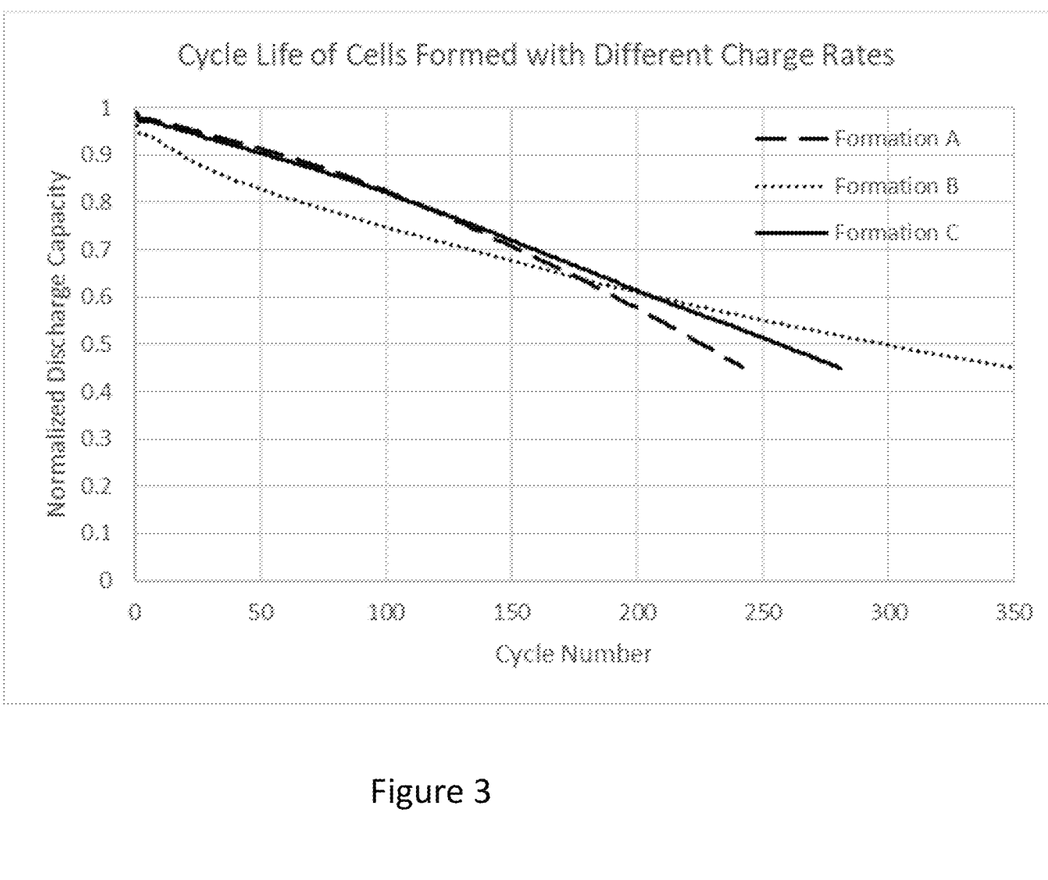
FIG. 3 shows the normalized discharge capacity as a function of cycle number of cells formed with different charge rates.

FIG. 3 shows the normalized discharge capacity as a function of cycle number of cells formed with different charge rates in a CC/CV regime. The cells were constructed using silicon composite anodes with 85% silicon content by weight, with average loading of 4.2 mg/cm$^2$ and average thickness of 93 µm, attached to 15 µm copper foil with a polymer adhesive. The cathodes were 92% lithium nickel cobalt manganese, 4% conductive additive, and 4% PVdF, coated on 15 µm aluminum foil at an average loading of 46 mg/cm$^2$ and an average density of 3.0 g/cc. The electrolyte was a solution of 1.2 M LiPF$_6$ in organic carbonates. The cell design included 5 layers, with overall dimensions of 53 mm×64 mm×1.911 mm and a nominal capacity of 720 mAh. The cells were formed using 3 different formation protocols (3 cells each):

A. 1 C charge to 4.2V until 0.05 C, discharge at 1 C to 3.3V.
B. C/40 charge to 4.2V, rest 10 minutes, discharge at 1 C to 3.3V, rest 10 minutes.
C. Charge at C/40 to 25% nominal capacity, charge at 1 C to 4.2V until 0.05 C, discharge at 1 C to 3.3V, rest 10 minutes.

The first charge was charged to 4.2V, followed by a 1 C discharge to 3.3V. The cells were cycled at room temperature between 4.2 and 2.75V v. Li/Li+ at 2 C charge and 0.5 C discharge rates. Formation A is an example of a protocol using a fast charge rate (e.g., providing a formation charge current at 1 C). Formation B is an example of a protocol using a slow charge rate (e.g., providing a formation charge current at C/40). Formation C is an example of a protocol using a combination of slow and fast rates (e.g., providing a formation charge current at C/40 and at 1 C). By including a fast charge portion during formation, the time to complete formation can be shorter. The silicon-dominant anode can complete formation in a fraction of the time used in conventional manufacturing, and with less sophisticated equipment. This is possible because the silicon-dominant anode can accept high charge rates without plating lithium, and without causing any undesired side-reactions during formation. It can be formed using a simple constant voltage/constant current (CV/CC) regime, with minimal programming requirements and minimal current control.

The cells had very similar capacity retention on a normalized basis, but the cells with Formation B had lower initial discharge capacity. The cell formed by Formation C, charged with a combination of slow and fast rates, exhibited cycle performance with the advantages of both Formation A and B, an initial high capacity retention plus a slower capacity fade beyond 150 cycles.

Using a formation charge rate that is slow (e.g., from C/100 to C/10) can be advantageous for cell cycling performance because it can allow for a more robust SEI layer formation than that formed by only a faster formation rate (e.g., 1 C or greater). SEI formation can be important as it influences subsequent cycling performance of the cell.

Figure 4:
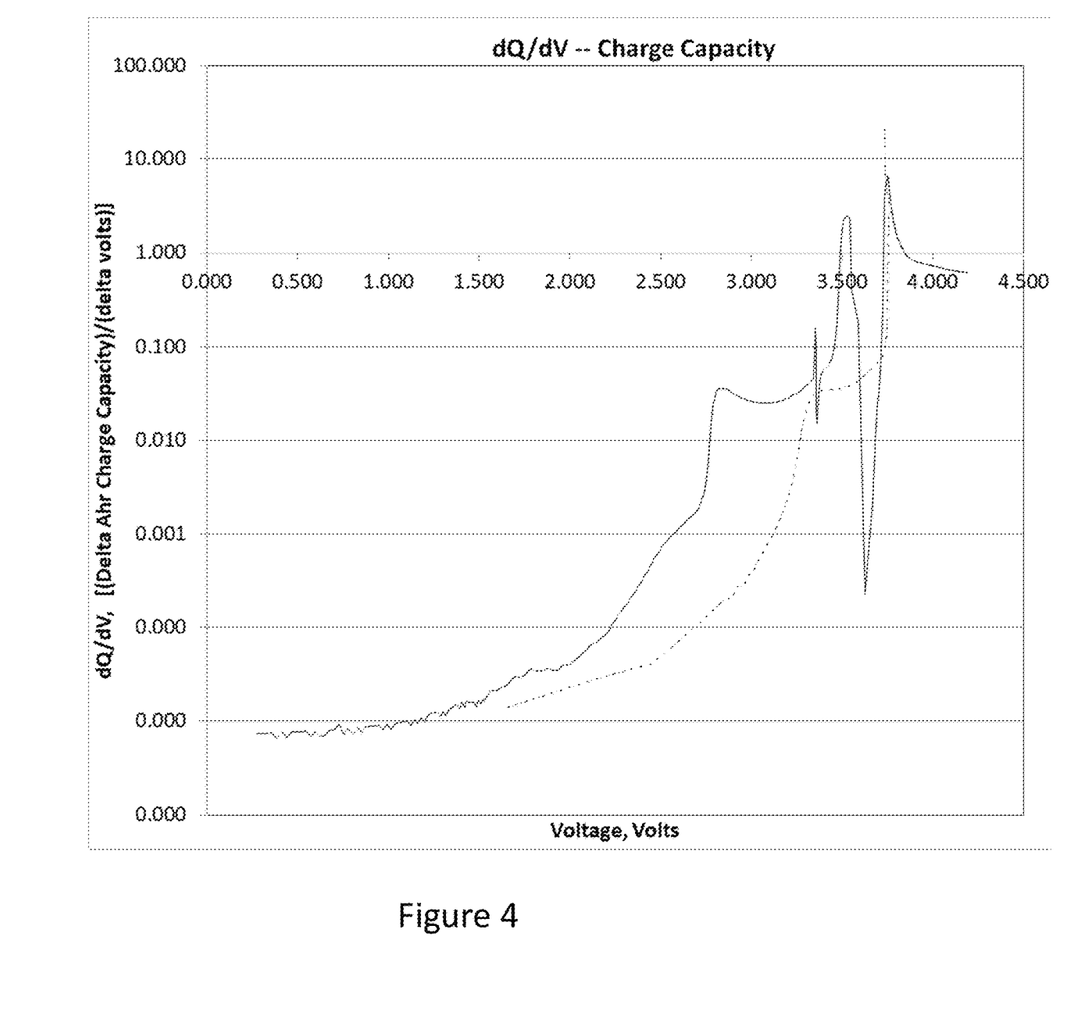
FIG. 4 shows the change in charge divided by voltage change (dQ/dV) as a function of voltage during the first formation charge cycle of cells formed with different charge rates.

FIG. 4 shows a logarithmic scale of change of charge divided by voltage change (e.g., dQ/dV) as a function of the voltage during the first formation charge cycle for cells with two different formation rates. The dotted line is the dQ/dV of a cell formed with a 1 C formation charge rate, while the solid line is the dQ/dV of a cell formed with a combination of 1 C and C/40 charge rates. The solid line, with peaks between 1V and 4V, demonstrates that SEI formation is occurring within that potential window during charge. The dashed line, however, has a lower peak magnitude than the solid line in this voltage region, indicating that fewer reactions forming the SEI are occurring. In various implementations, formation of cells using a combination of slow and fast formation charge rates can combine the advantages of a robust SEI layer growth with the time savings for fast formation. Furthermore, the formation could be changed depending on the application. In some instances, formation can be changed (e.g., either on demand or by batch) to the desired characteristics of the final application. For example, with a single cell design, the performance of the cell could be modified significantly with different formation rates and can be used to customize performance.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of forming an electrochemical cell, the method comprising:
    providing an electrochemical cell comprising:
        a first electrode and a second electrode, wherein at least the first electrode comprises at least about 20% to about 99% by weight of silicon;
        a separator between the first electrode and the second electrode; and
        an electrolyte in contact with the first electrode, the second electrode, and the separator, wherein the electrochemical cell has a rated capacity of 1 C; and
    providing, during a formation process, a formation charge current at a first rate of constant current and at a second rate of constant current to the electrochemical cell, wherein the first rate is in a range from about C/100 to about C/10 and the second rate is greater than about C/10, and wherein the providing comprises:
        providing the formation charge current at the first rate of constant current until reaching a predetermined fraction of nominal capacity for the cell; and
        providing the formation charge current at the second rate of constant current after reaching a predetermined fraction of nominal capacity for the cell;
    wherein providing the formation charge current comprises providing the formation charge current at the first rate until 5 to 50% nominal capacity, and providing the formation charge current at the second rate until the cell voltage reaches 4.0 volts to about 4.5 volts.

2. The method of claim 1, wherein the first rate is in a range from about C/80 to about C/10.

3. The method of claim 2, wherein the first rate is in a range from about C/60 to about C/10.

4. The method of claim 3, wherein the first rate is in a range from about C/50 to about C/10.

5. The method of claim 1, wherein the second rate is less than or equal to about 10 C.

6. The method of claim 1, wherein the second rate is greater than about 0.5 C and less than or equal to about 10 C.

7. The method of claim 1, wherein the second rate is greater than about 1 C and less than or equal to about 10 C.

8. The method of claim 1, wherein the second rate is greater than about 1.5 C and less than or equal to about 10 C.

9. The method of claim 1, wherein the formation charge current is provided at the first rate for about 1 minute to about 1,000 minutes.

10. The method of claim 1, wherein the formation charge current is provided at the second rate for about 1 minute to about 1,000 minutes.

11. The method of claim 1, wherein providing the formation charge current comprises charging to partial formation at the first rate.

12. The method of claim 11, wherein charging to partial formation at the first rate comprises charging to about 10% to about 50% of the total capacity of the electrochemical cell.

13. The method of claim 12, wherein charging to partial formation at the first rate comprises charging to about 10% to about 30% of the total capacity of the electrochemical cell.

14. The method of claim 1, wherein the formation charge current is provided at the first rate prior to the second rate.

15. The method of claim 1, wherein the formation charge current is provided at the second rate prior to the first rate.

16. The method of claim 1, wherein the entire formation of the cell is completed within a single charge or a single charge/discharge cycle.

17. The method of claim 1, wherein providing the formation charge current comprises providing the formation charge current until the cell voltage reaches 4.0 volts to about 4.5 volts.

18. The method of claim 1, wherein the electrochemical cell is a lithium-ion battery and providing the formation charge current comprises providing the formation charge current with substantially no lithium plating.

19. The method of claim 1, wherein the first electrode is an anode.

20. The method of claim 1, wherein the first electrode comprises a silicon-dominant electrode.

21. The method of claim 1, wherein the first electrode comprises the silicon at about 30% to about 99% by weight.

22. The method of claim 21, wherein the first electrode comprises the silicon at about 40% to about 99% by weight.

23. The method of claim 22, wherein the first electrode comprises the silicon at about 50% to about 99% by weight.

24. The method of claim 23, wherein the first electrode comprises the silicon at about 60% to about 99% by weight.

25. The method of claim 24, wherein the first electrode comprises the silicon at about 70% to about 99% by weight.

26. The method of claim 25, wherein the first electrode comprises the silicon at about 80% to about 99% by weight.

27. A method of forming an electrochemical cell, the method comprising:
    providing an electrochemical cell comprising:

a first electrode and a second electrode, wherein at least the first electrode comprises at least about 20% to about 99% by weight of silicon;
a separator between the first electrode and the second electrode; and
an electrolyte in contact with the first electrode, the second electrode, and the separator, wherein the electrochemical cell has a rated capacity of 1 C; and
providing, during a formation process, a formation charge current at a first rate of constant current and at a second rate of constant current to the electrochemical cell, wherein the first rate is in a range from about C/100 to about C/10 and the second rate is greater than about C/10, and wherein the providing comprises:
providing the formation charge current at the first rate of constant current until reaching a predetermined fraction of nominal capacity for the cell; and
providing the formation charge current at the second rate of constant current after reaching a predetermined fraction of nominal capacity for the cell;
wherein providing the formation charge current comprises charging to partial formation at the second rate; and
wherein charging to partial formation at the second rate comprises charging to about 50% to about 90% of total capacity of the electrochemical cell.

28. The method of claim 27, wherein the first rate is in a range from about C/80 to about C/10.

29. The method of claim 28, wherein the first rate is in a range from about C/60 to about C/10.

30. The method of claim 29, wherein the first rate is in a range from about C/50 to about C/10.

31. The method of claim 27, wherein the second rate is less than or equal to about 10 C.

32. The method of claim 27, wherein the second rate is greater than about 0.5 C and less than or equal to about 10 C.

33. The method of claim 27, wherein the second rate is greater than about 1 C and less than or equal to about 10 C.

34. The method of claim 27, wherein the second rate is greater than about 1.5 C and less than or equal to about 10 C.

35. The method of claim 27, wherein the formation charge current is provided at the first rate for about 1 minute to about 1,000 minutes.

36. The method of claim 27, wherein the formation charge current is provided at the second rate for about 1 minute to about 1,000 minutes.

37. The method of claim 27, wherein providing the formation charge current comprises charging to partial formation at the first rate.

38. The method of claim 37, wherein charging to partial formation at the first rate comprises charging to about 10% to about 50% of the total capacity of the electrochemical cell.

39. The method of claim 38, wherein charging to partial formation at the first rate comprises charging to about 10% to about 30% of the total capacity of the electrochemical cell.

40. The method of claim 27, wherein charging to partial formation at the second rate comprises charging to about 70% to about 90% of total capacity of the electrochemical cell.

41. The method of claim 27, wherein the formation charge current is provided at the first rate prior to the second rate.

42. The method of claim 27, wherein the formation charge current is provided at the second rate prior to the first rate.

43. The method of claim 27, wherein the entire formation of the cell is completed within a single charge or a single charge/discharge cycle.

44. The method of claim 27, wherein providing the formation charge current comprises providing the formation charge current until the cell voltage reaches 4.0 volts to about 4.5 volts.

45. The method of claim 27, wherein the electrochemical cell is a lithium-ion battery and providing the formation charge current comprises providing the formation charge current with substantially no lithium plating.

46. The method of claim 27, wherein the first electrode is an anode.

47. The method of claim 27, wherein the first electrode comprises a silicon-dominant electrode.

48. The method of claim 27, wherein the first electrode comprises the silicon at about 30% to about 99% by weight.

49. The method of claim 48, wherein the first electrode comprises the silicon at about 40% to about 99% by weight.

50. The method of claim 49, wherein the first electrode comprises the silicon at about 50% to about 99% by weight.

51. The method of claim 50, wherein the first electrode comprises the silicon at about 60% to about 99% by weight.

52. The method of claim 51, wherein the first electrode comprises the silicon at about 70% to about 99% by weight.

53. The method of claim 52, wherein the first electrode comprises the silicon at about 80% to about 99% by weight.

54. A method of forming an electrochemical cell, the method comprising:
providing an electrochemical cell comprising:
a first electrode and a second electrode, wherein at least the first electrode comprises at least about 20% to about 99% by weight of silicon;
a separator between the first electrode and the second electrode; and
an electrolyte in contact with the first electrode, the second electrode, and the separator, wherein the electrochemical cell has a rated capacity of 1 C; and
providing, during a formation process, a formation charge current at a first rate of constant current and at a second rate of constant current to the electrochemical cell, wherein the first rate is in a range from about C/100 to about C/30 and the second rate is greater than about C/10, and wherein the providing comprises:
providing the formation charge current at the first rate of constant current until reaching a predetermined fraction of nominal capacity for the cell; and
providing the formation charge current at the second rate of constant current after reaching a predetermined fraction of nominal capacity for the cell.

55. The method of claim 54, wherein the first rate is in a range from about C/80 to about C/30.

56. The method of claim 55, wherein the first rate is in a range from about C/60 to about C/30.

57. The method of claim 56, wherein the first rate is in a range from about C/50 to about C/30.

58. The method of claim 54, wherein the second rate is less than or equal to about 10 C.

59. The method of claim 54, wherein the second rate is greater than about 0.5 C and less than or equal to about 10 C.

60. The method of claim 54, wherein the second rate is greater than about 1 C and less than or equal to about 10 C.

61. The method of claim 54, wherein the second rate is greater than about 1.5 C and less than or equal to about 10 C.

62. The method of claim 54, wherein the formation charge current is provided at the first rate for about 1 minute to about 1,000 minutes.

63. The method of claim 54, wherein the formation charge current is provided at the second rate for about 1 minute to about 1,000 minutes.

64. The method of claim 54, wherein providing the formation charge current comprises charging to partial formation at the first rate.

65. The method of claim 64, wherein charging to partial formation at the first rate comprises charging to about 10% to about 50% of the total capacity of the electrochemical cell.

66. The method of claim 65, wherein charging to partial formation at the first rate comprises charging to about 10% to about 30% of the total capacity of the electrochemical cell.

67. The method of claim 54, wherein providing the formation charge current comprises charging to partial formation at the second rate.

68. The method of claim 67, wherein charging to partial formation at the second rate comprises charging to about 50% to about 90% of total capacity of the electrochemical cell.

69. The method of claim 68, wherein charging to partial formation at the second rate comprises charging to about 70% to about 90% of total capacity of the electrochemical cell.

70. The method of claim 54, wherein the formation charge current is provided at the first rate prior to the second rate.

71. The method of claim 54, wherein the formation charge current is provided at the second rate prior to the first rate.

72. The method of claim 54, wherein the entire formation of the cell is completed within a single charge or a single charge/discharge cycle.

73. The method of claim 54, wherein providing the formation charge current comprises providing the formation charge current until the cell voltage reaches 4.0 volts to about 4.5 volts.

74. The method of claim 54, wherein providing the formation charge current comprises providing the formation charge current at the first rate until 5 to 50% nominal capacity, and providing the formation charge current at the second rate until the cell voltage reaches 4.0 volts to about 4.5 volts.

75. The method of claim 54, wherein the electrochemical cell is a lithium-ion battery and providing the formation charge current comprises providing the formation charge current with substantially no lithium plating.

76. The method of claim 54, wherein the first electrode is an anode.

77. The method of claim 54, wherein the first electrode comprises a silicon-dominant electrode.

78. The method of claim 54, wherein the first electrode comprises the silicon at about 30% to about 99% by weight.

79. The method of claim 78, wherein the first electrode comprises the silicon at about 40% to about 99% by weight.

80. The method of claim 79, wherein the first electrode comprises the silicon at about 50% to about 99% by weight.

81. The method of claim 80, wherein the first electrode comprises the silicon at about 60% to about 99% by weight.

82. The method of claim 81, wherein the first electrode comprises the silicon at about 70% to about 99% by weight.

83. The method of claim 82, wherein the first electrode comprises the silicon at about 80% to about 99% by weight.

* * * * *